United States Patent [19]
Miyata

[11] Patent Number: 4,943,145
[45] Date of Patent: Jul. 24, 1990

[54] DISPLAY METHOD AND APPARATUS

[75] Inventor: Seizo Miyata, 3-18-26 Shimohoya, Hoya-shi, Tokyo, Japan

[73] Assignees: Canon Kabushiki Kaisha; Seizo Miyata, both of Tokyo, Japan

[21] Appl. No.: 217,650

[22] Filed: Jul. 12, 1988

[30] Foreign Application Priority Data

Jul. 13, 1987 [JP] Japan .................................. 175200

[51] Int. Cl.$^5$ .......................... G02F 1/01; H03F 7/00; H04N 3/02
[52] U.S. Cl. .................................... 350/354; 358/199; 358/231; 307/425
[58] Field of Search ................ 350/354; 358/199, 231, 358/232, 236; 372/21, 22; 307/425, 426, 427, 428

[56] References Cited

U.S. PATENT DOCUMENTS

| | | | |
|---|---|---|---|
| 3,699,478 | 10/1972 | Pinnow et al. | 358/231 X |
| 4,097,115 | 6/1978 | Garwin et al. | 358/231 X |
| 4,213,153 | 7/1980 | Schafer et al. | 358/231 |
| 4,295,159 | 10/1981 | Carollo et al. | 358/236 X |

Primary Examiner—Eugene R. LaRoche
Assistant Examiner—Nathan W. McCutcheon
Attorney, Agent, or Firm—Fitzpatrick, Cella, Harper & Scinto

[57] ABSTRACT

A display system includes a display medium which comprises a display layer providing a display area capable of converting coherent light into light of a shorter wavelength through a nonlinear optical effect and converting the coherent light into scattered light. The display area is illuminated imagewise with coherent light such as a scanning laser beam to form a display image with scattered light having a wavelength different from that of the coherent light at the illuminated part of the display area.

25 Claims, 5 Drawing Sheets

DISPLAY METHOD AND APPARATUS

FIELD OF THE INVENTION AND RELATED ART

The present invention relates to a display method and a display apparatus of light emission-type, and particularly to a display method and a display apparatus capable of providing a fine color display.

As display apparatus or devices of light emission-type, there have been known CRT (cathode ray tube), EL (electro-luminescence) panel, plasma display panel, fluorescent display tube, LED (light-emitting diode) display, etc. Among them, CRT is used as the most common display apparatus of a light emission-type. According to the display principles thereof, thermionic electrons are accelerated to excite a fluorescent screen for light emission and color display is effected by selection of the fluorescent material. EL panel has been considered as a flat panel display, wherein an electroluminescent material such as ZnS doped with Mn constituting a luminescent center is supplied with a DC or AC electric field to excite the luminescent center thereby to cause light emission. The wavelength of the emitted light can be controlled by selecting the dopant. In the plasma display, light emission is effected by gas excitation caused by gas discharge. The wavelength of the emitted light is restricted by the kind of the gas used, while it has also been tried to effect a color display be selecting a gas capable of emitting ultraviolet rays and exciting a fluorescent member with the ultraviolet rays.

In the fluorescent display tube, thermionic electrons emitted from a cathode filament are accelerated to excite a fluorescent member by impingement, thereby to cause light emission. The emitted light wavelength can be controlled by selecting the fluorescent material. In the LED display, a large number of light emitting diodes are arranged to effect a display. Display at various wavelengths can be effected through selection of LED materials.

In the above-described conventional display systems, however, the selection of the material or emission wavelength must be effected for each display pixel, so that it is difficult to provide a fine display of a large area. For example, a large area CRT isaccompanied with a remarkable increase in volume and weight, and therefore cannot be used easily at home. Particularly, in order to effect a color display, a pixel must be formed and selected for the respective wavelengths, so that the system becomes complicated and expensive.

SUMMARY OF THE INVENTION

A principle object of the present invention is to provide a novel display method and display apparatus having solved the above-mentioned defects of the conventional display systems.

The present invention provides a display method and a display apparatus constituting a display system, wherein a display medium having a display area capable of changing the wavelength of coherent light ad converting the coherent light into scattered light is provided, and the image area of the display medium is illuminated imagewise with coherent light to form a display image with scattered light having a wavelength different from that of the coherent light at the illuminated part of the display area.

In a preferred embodiment of the present invention, a display medium comprising a nonlinear optical material in the form of a film is illuminated with laser light as the coherent light to change the wavelength of the laser light through optical second hormonic generation (SHG) or optical third harmonic generation (THG) and to simultaneously scatter the optical harmonic, to effect a display. By using such a display system, a luminescent display can be effected without specifically providing pixels for display. Furthermore, a color display can be effected by only selecting the wavelength of the illuminating laser light and without forming the display area with pixels corresponding to the respective wavelengths for color display. Thus, a display apparatus can be formed with a large area and a high density without specific device or apparatus consideration therefor.

These and other objects, features and advantages of the present invention will become more apparent upon a consideration of the following description of the preferred embodiments of the present invention taken in conjunction with the accompanying drawings, wherein like parts are denoted by like reference numerals.

DESCRIPTION OF THE PREFERRED EMBODIMENTS

Figure 1:
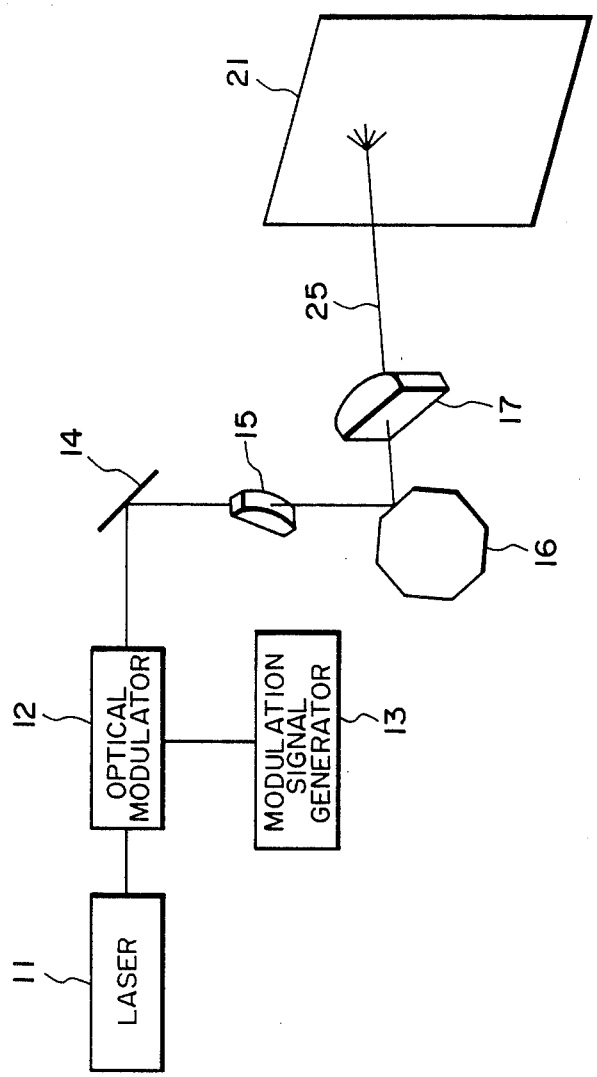
FIG. 1 is a block diagram illustrating an embodiment of the display apparatus according to the present invention.
Figure 2:
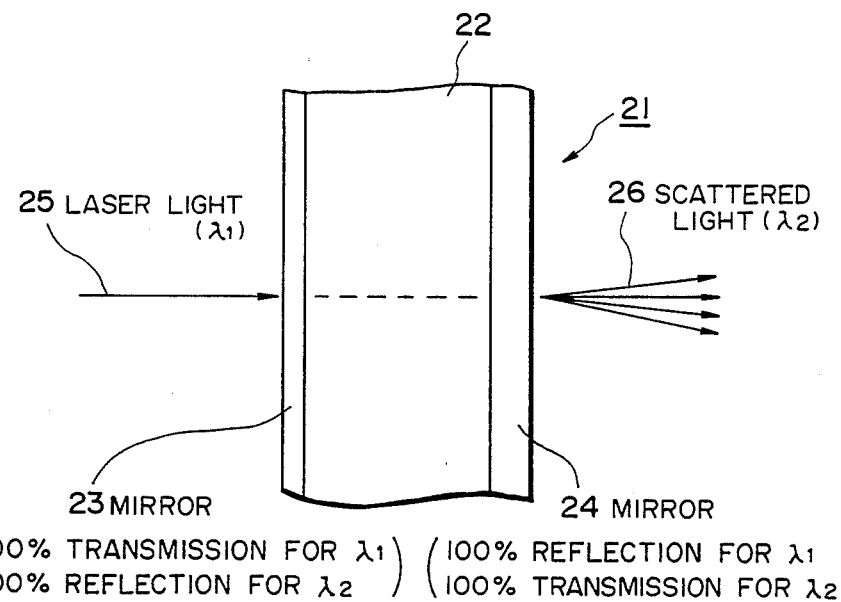
FIG. 2 is a schematic sectional view of a display medium for illustration of its structure and operation according to the invention.

FIG. 1 is a block diagram of an embodiment of the display apparatus of the present invention, and FIG. 2 is a schematic sectional view of a display medium 21 for illustrating its structure and display principle according to the present invention.

First of all, a basic structure of a display medium 21 is explained with reference to FIG. 2. The display medium 21 shown in FIG. 2 comprises a film 22 having a nonlinear optical characteristic of changing the wavelength of coherent light 25 and converting the coherent light into scattered light disposed between two mirrors 23 ad 24. More specifically, the film 22 may comprise a nonlinear optical compound (or material) which is capable of optical harmonic generation and may preferably be in the form of crystal powder or a solid solution in a polymer as will be explained hereinafter. Examples of such a compound (or material) capable of, particularly, second harmonic generation may include the following:

Examples of non-linear optical compound (or material)

$(H_2N)_2CO$                                            (1)

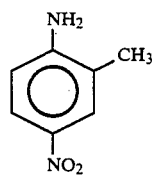 (2)

-continued
Examples of non-linear optical compound (or material)
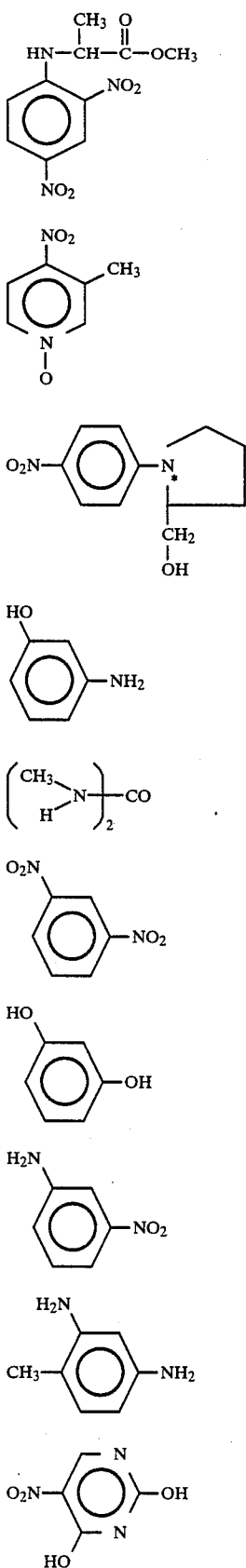
-continued
Examples of non-linear optical compound (or material)
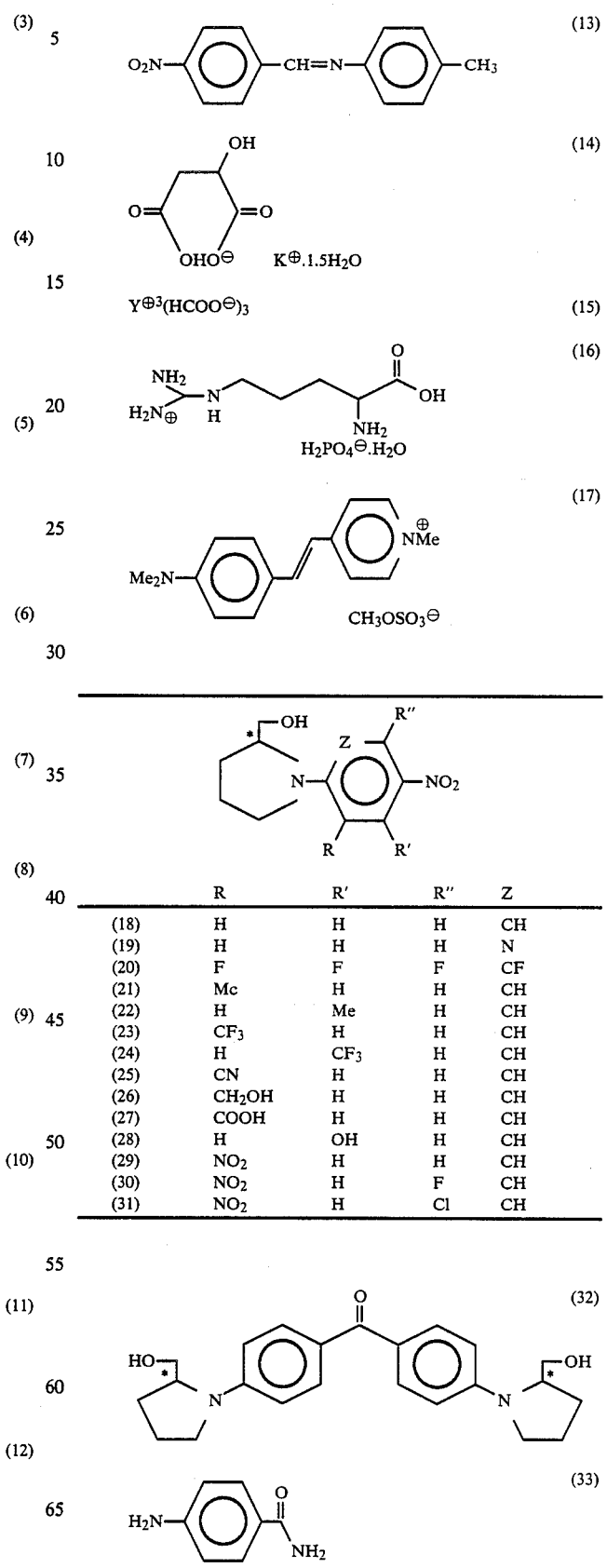
| | R | R' | R'' | Z |
|---|---|---|---|---|
| (18) | H | H | H | CH |
| (19) | H | H | H | N |
| (20) | F | F | F | CF |
| (21) | Me | H | H | CH |
| (22) | H | Me | H | CH |
| (23) | CF$_3$ | H | H | CH |
| (24) | H | CF$_3$ | H | CH |
| (25) | CN | H | H | CH |
| (26) | CH$_2$OH | H | H | CH |
| (27) | COOH | H | H | CH |
| (28) | H | OH | H | CH |
| (29) | NO$_2$ | H | H | CH |
| (30) | NO$_2$ | H | F | CH |
| (31) | NO$_2$ | H | Cl | CH |

-continued
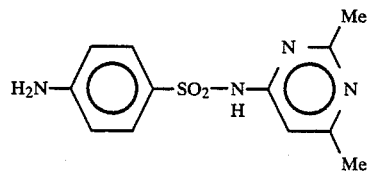 (34)
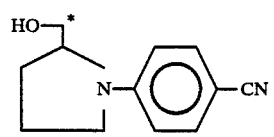 (35)
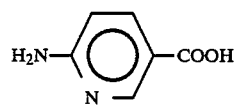 (36)
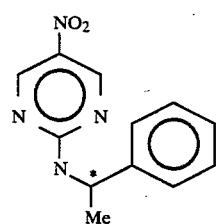 (37)
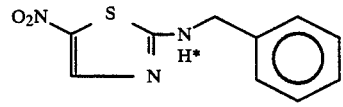 (38)
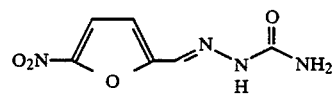 (39)
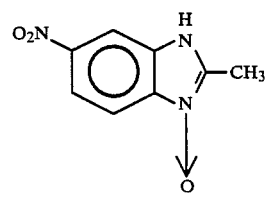 (40)
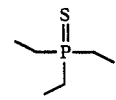 (41)
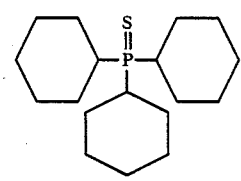 (42)
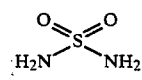 (43)
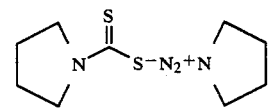 (44)
-continued
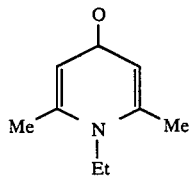 (45)
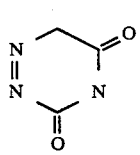 (46)
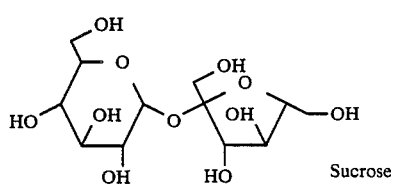 Sucrose (47)
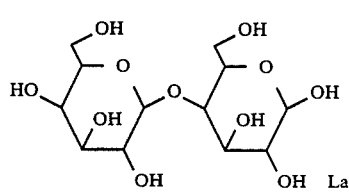 Lactose (48)
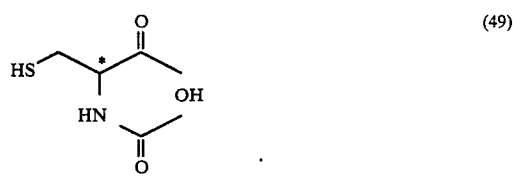 (49)
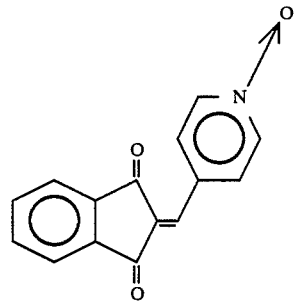 (50)
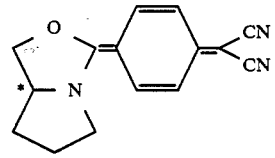 (51)
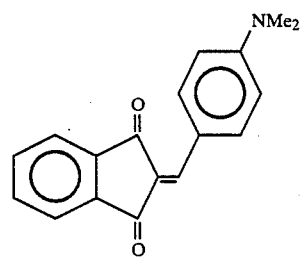 (52)

-continued

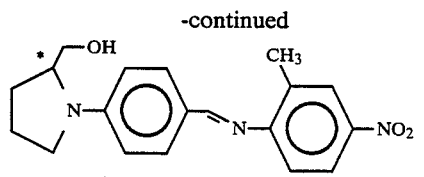 (53)

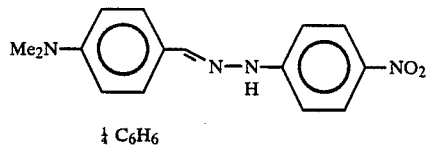 (54)

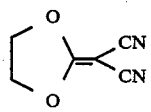 (55)

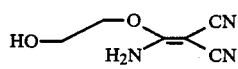 (56)

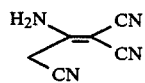 (57)

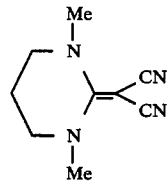 (58)

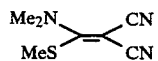 (59)

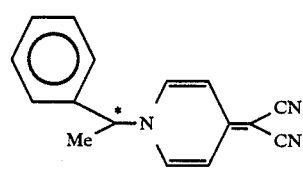 (60)

-continued $$\text{structure with D, R, R', Z substituents on nitrobenzene}$$

| | D | R | R' | Z |
|---|---|---|---|---|
| (65) | 4-hydroxypiperidin-1-yl | H | H | CH (65a) |
| | | H | CF$_3$ | CH (65b) |
| | | CN | H | CH (65c) |
| (66) | NC-CH$_2$CH$_2$-N(Me)- | H | H | CH |
| (67) | NC-CH$_2$-N(Me)- | H | H | CH |
| (68) | H | H | H | CH |
| (69) | cyclohexyl-NH- | H | H | CH (69a) |
| | | H | H | N (69b) |
| (70) | Me$_2$N- | NHCOMe | H | CH (70a) |
| | | NHCOCF$_3$ | H | CH (70b) |
| (71) | piperidin-1-yl | NHCOMe | H | CH |
| (72) | H$_2$N- | NHCOMe | H | CH |
| (73) | 2-naphthyloxy- | H | H | N |
| (74) | Cl- | H | H | N (74a) |
| | | NO$_2$ | H | N (74b) |
| (75) | MeO- | H | H | N |
| (76) | 2-methylbutyl-NH- | H | H | CH (76a) |
| | | H | H | N (76b) |
| (77) | HOCH$_2$CH(Me)-NH- | H | H | CH (77a) |
| | | H | H | N (77b) |
| | | Me | H | CH (77c) |
| | | CN | H | CH (77d) |
| (78) | HOCH$_2$CH(Et)-NH- | H | H | CH |

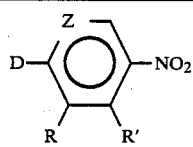

| | D | R | R' | Z |
|---|---|---|---|---|
| (61) | H$_2$N- | Me | H | CH (61a) |
| | | Cl | H | CH (61b) |
| (62) | MeNH- | Me | H | CH (62a) |
| | | Cl | H | CH (62b) |
| (63) | HOCH$_2$CH$_2$-NH- | COOH | H | CH (63a) |
| | | H | H | N (63b) |
| (64) | HOCH$_2$CH$_2$CH$_2$-NH- | H | H | CH (64a) |
| | | Me | H | CH (64b) |
| | | CF$_3$ | H | CH (64c) |
| | | H | CF$_3$ | CH (64d) |

-continued

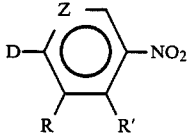

| | D | R | R' | Z |
|---|---|---|---|---|
| (79) | 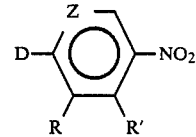 | H<br>CN<br>H<br>H | H<br>H<br>OH<br>H | CH... (79a)<br>CH... (79b)<br>CH... (79c)<br>N... (79d) |
| (80) | 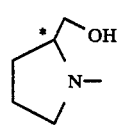 | H | H | CH |
| (81) | Ph—CH—CH—N—<br>　　\|　　\|　　\|<br>　　OH　Me　Me<br>(+)pseudoephedrine | H<br>H | H<br>H | CH... (81a)<br>N... (81b) |
| (82) | Ph—CH—CH—N—<br>　　\|　　\|　　\|<br>　　OH　CH₃　H<br>(−)norpseudoephedrine | H | H | CH |
| (83) | 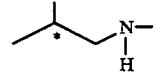 | H | H | N |
| (84) | 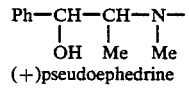 | H | H | N |
| (85) | 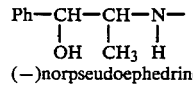 | H | H | N |
| (86) | 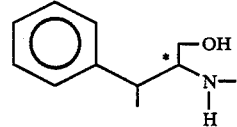 | Me<br>NO₂<br>H<br>Me | H<br>H<br>H<br>H | CH... (86a)<br>N... (86b)<br>N... (86c)<br>N... (86d) |
| (87) | 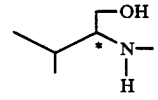 | H<br>Me<br>NO₂ | H<br>H<br>H | N... (87a)<br>N... (87b)<br>N... (87c) |
| (86) | PhN<br>　H<br>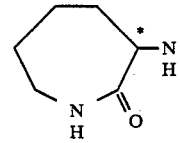 | H | H | CH |

-continued

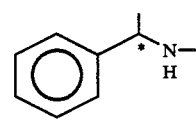

| | D | R | R' | Z |
|---|---|---|---|---|
| (89) | 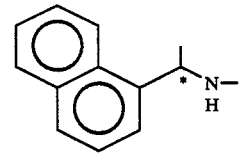 | H | H | CH |
| (90) | 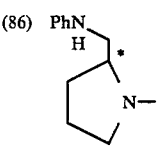 | H | H | CH |

(91) LiNbO₃
(92) KTiOPO₄ (KTP)
(93) β-BaB₂O₄

In the above, Me denotes a methyl group, Ph denotes a phenyl group, and * denotes the location of an asymmetric carbon atom.

A display medium used in the present invention may be basically prepared by forming a layer of such a nonlinear optical compound (or material) to provide a display area. In a preferred embodiment, such a nonlinear optical compound in a pulverized form is dispersed in a binder and applied on a substrate (such as a glass plate, or a mirror 23 or 24 in FIG. 2) to form a film or a dispersion of the compound in a binder and is directly formed into a film. The binder may preferably comprise a polymer.

If the displayer layer providing a display area is formed as a film by using a polymer binder, the displayer layer is not only provided with a uniform thickness and dispersion structure, thus a uniform performance over a wide area free of display irregularity, but also provided with an excellent light-fastness or resistance to optical damage. The improved resistance to optical damage leads to a stable performance of the display medium when it is used under an enhanced luminance.

The binder polymer to be used for the above purpose may be any film-formable polymer, and examples thereof may include: polyester, polyamide, polyether, polyoxyalkylene, polyvinyl chloride, polyalkyl methacrylate, polyalkyl acrylate, polyimide, polysulfone, polyether sulfone, polyvinyl acetate, polyvinylidene fluoride, poly(vinylidene fluoride-trifluoroethylene), poly(-vinylidene cyanide-vinyl acetate), ethyl cellulose, polypeptide, polyvinyl ether, polycarbonate, polyphenylene sulfone, polyphenylene ether, polyvinyl alcohol, polyacrylontrile, polyurethane, polyurea, polypropylene, polybutadiene, polyisoprene, and polytetrafluoroethylene.

Figure 5:
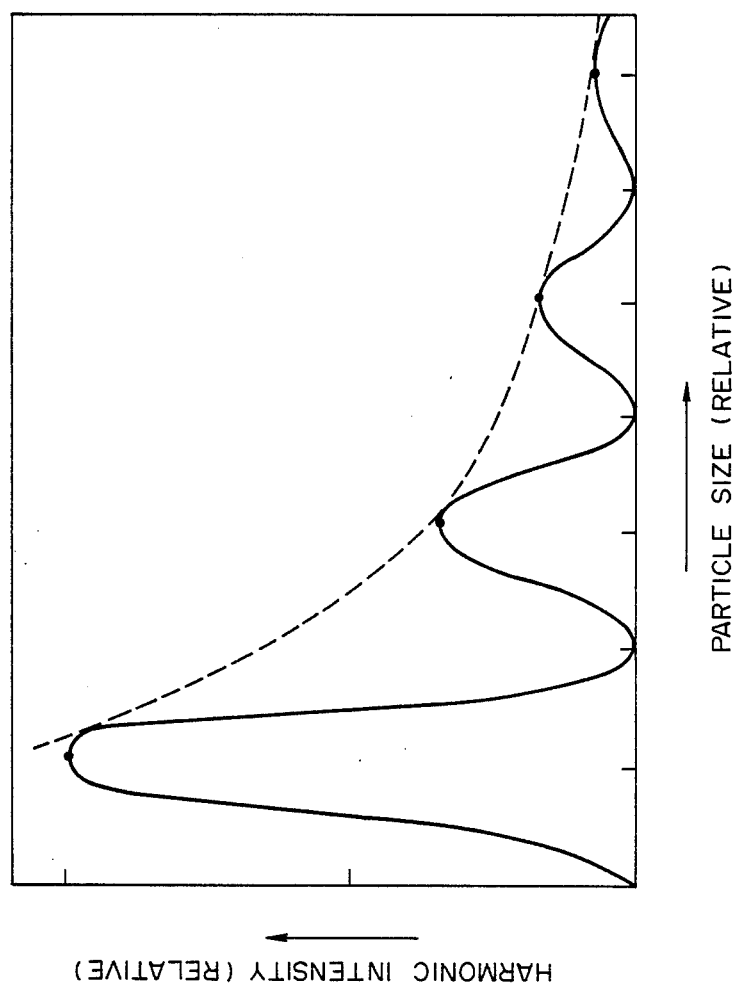
FIG. 5 is a diagram for illustrating a relationship between particle size and optical harmonic intensity.

As powder particles of a nonlinear optical compound crystal generate an optical harmonic having an intensity varying depending on their particle size, the performance of the display medium can be improved by selecting a particle size causing a sufficient degree of scattering ad further providing a large intensity of optical harmonic generation. Especially, as a nonlinear optical material not capable of phase matching shows a particle size-dependency of the pitch and intensity of optical harmonic generation due to refractive index anisotropy of the crystal as shown in FIG. 5, it is necessary to select a particle size giving a peak of optical harmonic generation intensity.

The average particle size of the nonlinear optical compound may be selected from the range of generally 1–500 microns, preferably 3–200 microns, and further preferably 5–10 microns or around several tens of microns. Further, the nonlinear optical compound in powder form may be contained in an amount not hindering the function of the resultant film together with the binder and generally in the range of 30–90 wt. % of the resultant film. The film may have a thickness in the range of generally 100–10000 microns, preferably 500–5000 microns.

In forming the film of the nonlinear optical compound dispersed in a polymer, it is also possible to add a powdery nonlinear optical compound in a solution of a polymer in an appropriate organic solvent such as acetonitrile or acetone, promoting dispersion by an ultrasonic disperser, a homogenizer, etc., and applying the resultant dispersion onto a substrate by means of a spinner coater, a roller coater, a dipping coating, etc., followed by drying.

In this instance, through appropriate selection of a binder polymer and a solvent, particularly one dissolving both the nonlinear optical compound and the binder polymer, it is possible to obtain the mixture in the form of a solid solution of a nonlinear optical compound in a binder or matrix polymer. For this purpose, it is preferred to use the nonlinear optical compound in a proportion of 5–80 wt. parts, particularly 10–70 wt. parts, per 100 parts of the polymer.

Such a solid solution film is particularly useful for providing a display medium used in the present invention as will be explained hereinafter. The fact that the nonlinear optical compound is in its solid solution state, i.e., free from crystallization, may for example be confirmed by the absence of an X ray diffraction peak attributable to the crystal of the nonlinear optical compound when a sample of e.g., a 0.1 to 2 mm-thick film, is subjected to the reflection X-ray analysis by means of an X-ray diffractometer (e.g., Model RAD-III, available from Rigaku Denki K.K.) or by the absence of a heat-absorption peak or shoulder attributable to the crystal of the nonlinear optical compound when a sample is subjected to heating at a temperature at a rate of 5–10° C./min by means of a DSC (differential scanning calorimeter).

Such a solid solution state film not only can be formed in a large area with good qualities including an excellent mechanical strength and a high degree of uniformity but also shows by itself a function of scattering SHG or THG light which may be attributable to the presence of spherulite. Further, the solid solution state film shows a large nonlinear optical constant and thus is very suitable for providing the display medium used in the present invention.

As the polymer for constituting a nonlinear optical film 22 (as shown in FIG. 2), it is particularly preferred to use polyoxyalkylene having recurring units as shown by the following formula (1):

    (1), wherein R denotes an alkylene group having 1–6 carbon atoms and n is 100–200,000. If R is 7 or more, the polyoxyalkylene is caused to have a poor mutual solubility with a nonlinear optical compound which generally has an electron attractive group and an electron donative group, thus failing to provide a film with excellent physical properties. Polyoxyalkylene with a group R having 2–4 carbon atoms is particularly preferred.

A solid solution of a nonlinear optical compound in a polyoxyalkylene matrix and a method for preparation thereof are described in more detail in Miyata, et al. U.S. patent application Ser. No. 164,414.

It is further possible to form a nonlinear optical film 22 (e.g., in FIG. 2) with a material by further dispersing a nonlinear optical compound in its crystal powder form as described above in a solid solution as described above of a nonlinear optical compound in a polymer matrix. In this case, the crystal powder may be dispersed in a proportion of 0.01–10 wt. parts, preferably 0.1–1 wt. part, per 100 wt. parts of the solid solution.

In the present invention, it is desirable for a nonlinear optical film or layer by itself or when supported on a transparent glass substrate to show a haze value of 10 % or higher, particularly 30 % or higher, as measured by using an integrating sphere-type transmittance meter (as defined in JIS K6714, K6717 and K6718) while it somewhat depends on a display mode as will be explained hereinafter. When light (preferably coherent light used for display) passes a sample film, it provides forward scattered light. The haze value defined herein corresponds to the proportion of a scattered light flux giving an average angle of 2.5 degrees of larger with respect to the incident light direction in the transmitted light.

Now, the operation of the display system is explained with reference to FIGS. 1 and 2. FIG. 1 is a block diagram of an embodiment of the display apparatus according to the present invention, which includes a laser 11 capable of emitting continuous or pulsed laser light, and an optical modulation device 12, such as a liquid crystal-shutter array or electro-optical crystal device for modulating the intensity, pulse duration, pulse number, duty ratio, etc., of the laser light from the laser 11 to effect a display of a luminance or gradational image. The signals for such modulation is supplied from a modulation signal generator 13. Herein, a set of the optical modulation device 12 and the modulation signal generator 13 is used for each laser light when a plurality of laser lights are to be controlled independently.

The laser light modulated by the modulator 12 is then caused to impinge on a mirror for vertical scanning 14 which changes its inclination in sychronism with the modulation to effect deflection of the laser light for scanning in the vertical direction of the display medium 21. Further, a polygonal mirror for horizontal scanning 16 receives the laser light from the mirror 14 and rotates in a controlled speed in synchronism with the modulation of the laser light to deflect the laser light 25 for horizontal scanning along the face of the display medium 21. At this time, toric lenses 15 and 17 are inserted to compensate optical path differences caused by the vertical scanning and horizontal scanning, respectively. The thus prepared controlled laser light 25 is used to illuminate imagewise the display area of the display medium 21 for a display with scattered harmonic as will be further explained with reference to FIGS. 2 to 4.

The laser 11 as a source of coherent light may for example be gas laser, solid laser, dye laser, semiconductor laser and excimer laser. More specifically, lasers suitable for use in display according to the present invention by using optical second harmonic generation (SHG) may be those emitting laser light with a wavelength ($\lambda_1$) of 800 nm–1.5 μm, including Nd-YAG laser ($\lambda_1 = 1.064$ microns), dye laser ($\lambda_1 = 800$–950 nm), semiconductor laser (AlGaAs, $\lambda_1 = 0.7$–1.0 microns; InGaAsP, $\lambda_1 = 1.0$ –1.6 micron), etc. In order to effect a display based on third harmonic generation (THG), the laser 11 may be one emitting wavelengths in the range of 1.2–2.3 microns. In addition to higher order harmonic generation described above, phenomena such as parametric amplification, three wave-mixing, four wave-mixing, etc., may also be used for display.

It is practically important to use an array of lasers 11 in order to provide an increased luminance. Particularly, a set of three or more laser emitting different wavelengths of laser light may be used to effect a color display. For example, a full color display may be realized by displaying green (532 nm) with SHG of Nd-YAG laser light, blue (450 nm) with SHG of AlGaAs semiconductor laser light and red (650 nm) with SHG of InGaAsP semiconductor laser light. By changing the intensity of the laser light 25 or changing the pulse duration or number of pulses of the laser light 25, a gradational display may be easily effected and also a fine full color display may be effected. In this instance, if semiconductor laser are used, an array of laser can be easily formed, selection of wavelengths and modulation also become easy, and the display apparatus can be made compact.

A display may be satisfactorily effected by scanningly deflecting the laser light or beam 25 to illuminate the display medium. The light-deflecting means may be a polygonal mirror 16 as shown in FIG. 1 or Galvano mirror, a rotational mirror, etc., which can be moved mechanically or by means of a bimorph based on a piezoelectric effect. Further, the scanning of the display medium with the laser light may also be effected by means of a LC-shutter array or electro-optical optical device.

When the display medium of a large display area is scanned, the display area can be divided depending on the laser power used and can be scanned separately.

Referring again to FIG. 2, the display medium 21 is illuminated imagewise with such modulated laser light 25 (wavelength $\lambda_1$) from its back side, and the laser light 25 is converted into its second harmonic (wavelength $\lambda_2$) and scattered by the nonlinear optical film 22 to provide an image with the transmitted scattered light 26 on the front side of the display medium 21. In this embodiment, a mirror 23 and a mirror 24 are disposed on the back and front sides, respectively, of the film 22 so as to constitute a bandpass filter for preventing the transmission of the laser light 25, whereby the display efficiency and the health security are improved. In this instance, the mirror 23 may desirably show a 100%-transmittance for wavelength $\lambda_1$ of the laser light 25 and a 100%-reflectance for wavelength $\lambda_2$ of the second harmonic. On the other hand, the mirror 24 may desirably show a 100%-reflectance for wavelength $\lambda_1$ of the laser light 25 and a 100%-transmittance for wavelength $\lambda_2$ of the second harmonic.

The nonlinear optical film 22 can further contain a compound emitting phosphorescence or fluorescence (herein, represented by a "fluorescent material"), so that the higher order harmonic such as the second harmonic generated by illumination with coherent light is converted into phosphorescence or fluorescence to prolong the life of the light observable for display. In this case, phosphorescence or luminescence is observed for display instead of simple scattered harmonic 26 but is not shown specifically as such in FIG. 2.

Examples of the compound emitting phosphorescence or luminescence may include fluorescent dyes, such as stilbene dyes, coumarin dyes, xanthine dyes, oxazine dyes and polymethine dyes; phosphorescent dyes, such as naphthalene dyes; and also inorganic fluorescent and phosphorescent materials. Such a compound emitting phosphorescence or fluorescence (fluorescent material) may be contained in a proportion of 0.01–20 wt. %, preferably 0.05– wt. %, of the film 22.

Figure 3:
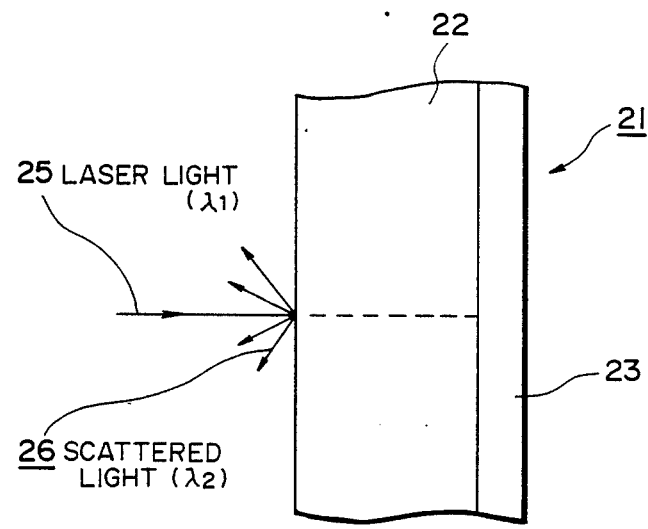
FIGS. 3 and 4A-4D are schematic sectional views of other display media for illustration of their structure and operation according to the invention.
Figure 4A:
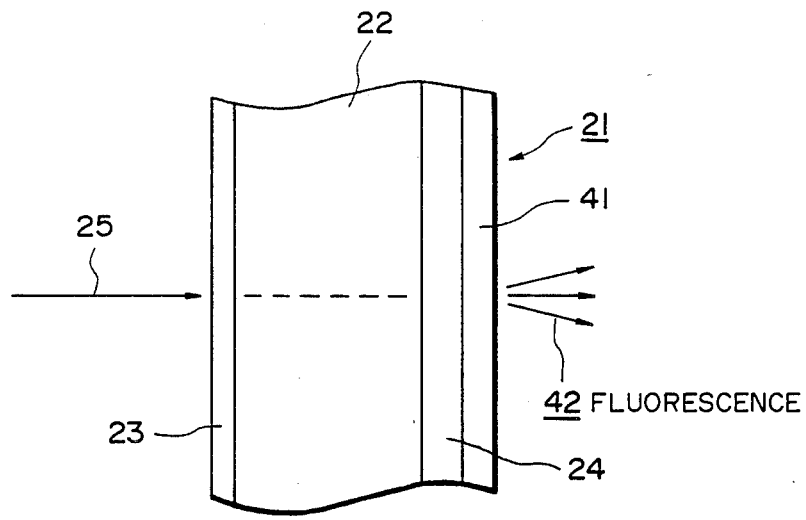
Figure 4B:
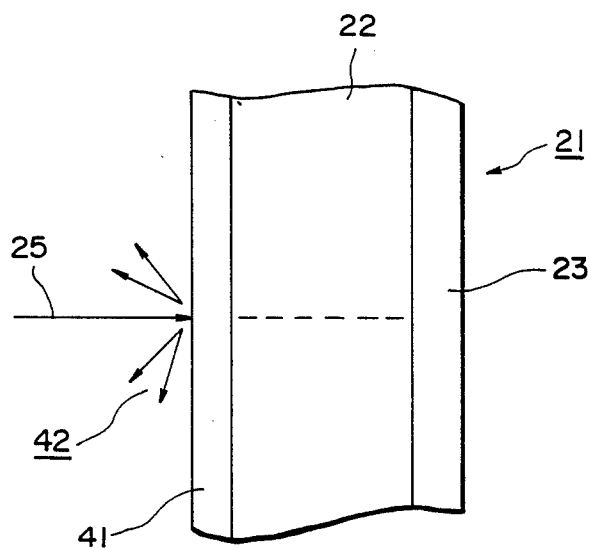
Figure 4C:
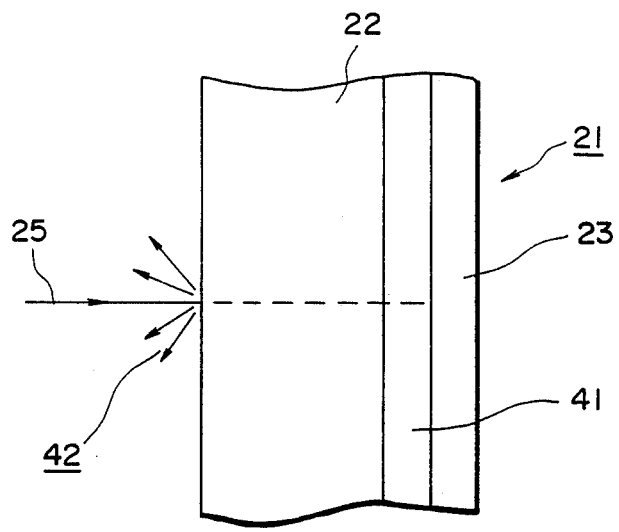
Figure 4D:
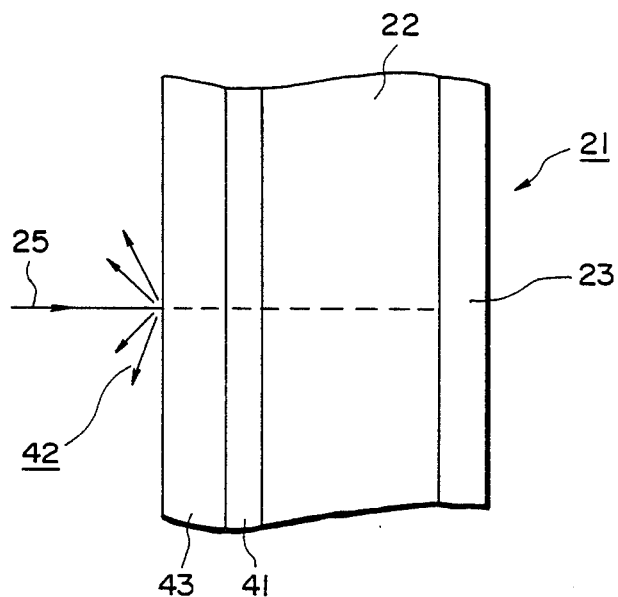

FIG. 3 is a schematic sectional view showing another type of display media 21 used in the present invention. Different from the display medium 21 of the transmission-type shown in FIG. 2, the display medium shown in this figure is of the reflection-type wherein a display medium 21 is illuminated from its front side with modulated laser light 25 to form a visible image with reflected scattered light 26 for display. In this case, it is preferred to provide on the backside of the display medium 21 (i.e., film 22) a mirror 23 comprising, e.g., a reflecting film of a metal, such as Al, Ag and Au, or one showing a 100%-transmitting for wavelength $\lambda_1$ of the laser light 25 and a 100%-reflectance for wavelength $\lambda_2$ of the second harmonic.

FIGS. 4A–4D show further modifications of display media used in the present invention, wherein scattered fluorescence 42 instead of scattered harmonic is used for display by disposing a fluorescent film 41 on the backside or frontside of the display medium 21. The mirrors 23 and 24 may preferably be those having wavelength selection characteristics as described above. The embodiment shown in FIG. 4D further comprises a second nonlinear optical film 43.

In any of the above embodiments, even if SHG is used for display, it is desirable to dispose a filter for cutting ultraviolet and infrared rays so as to remove the effect of partly generated THG and remove ill effects to human body.

Hereinbelow, the present invention will be explained more specifically based on Examples.

EXAMPLE 1

A film 22 was prepared in the following manner.

2 wt. parts of polyoxyethylene (POE) (M.W. (molecular weight): $5 \times 10^6$) and 1 wt. part of p-nitroaniline (P-NA) were dissolved in 10 wt. parts of acetonitrile. The resultant solution was applied onto a glass substrate provided with a coating of ITO (indium-tin-oxide) transparent electrode and dried to obtain a 0.5 mm thick film measuring 300 mm × 300 mm. An aluminum foil was applied on the film 22, which was then heated to 80° C. and supplied with a DC voltage of 600 V under cooling to room temperature in 2 hours, whereby a display medium 21 comprising a nonlinear optical film 22 and having a function similar to one shown in FIG. 3 was prepared. The display medium was illuminated imagewise with scanning Nd-YAG laser light entering almost perpendicularly from the ITO side through a polygonal mirror and a rotational mirror, whereby a good image with reflected scattered green light was observed.

EXAMPLE 2

1 wt. part of pulverized $LiNbO_3$ powder having an average particle size of 30–50 microns and 3 wt. parts of polymethyl methacrylate were dispersed and dissolved in 10 wt. parts of acetone to form a dispersion. A glass substrate provided with a first dielectric mirror transmitting 1.064 micron and reflecting 532 nm was coated with the above dispersion, followed by drying to form a 500 micron-thick nonlinear optical film. On the film, a second dielectric mirror reflecting 1.064 micron at 100% was disposed to form a display medium showing a function similar to one shown in FIG. 2. The thus-prepared display medium was illuminated imagewise with scanning Nd-YAG laser light, whereby an image with selectively transmitted scattered green light was observed.

EXAMPLE 3

2 wt. parts of polyoxyethylene (M.W.=$5\times10^6$) and 1 wt. part of p-nitroaniline (P-NA) were dissolved in 10 wt. parts of acetonitrile. Into the solution, 0.05 part of $LiNbO_3$ powder (average particle size$\times$30-50 microns) was dispersed, and the resultant dispersion was applied onto a glass substrate coated with an ITO transparent electrode to form a 0.5 mm-thick film. An aluminum film was applied on the film, which was then heated to 80° C. and supplied with a DC voltage of 600 V under cooling to room temperature in 2 hours, whereby a display medium 21 comprising a nonlinear optical film 22 and having a function similar to one shown in FIG. 3 was prepared. The display medium was illuminated imagewise with scanning Nd-YAG laser light entering almost perpendicularly from the ITO side through a polygonal mirror and a rotational mirror, whereby a good image with reflected scattered green light was observed.

EXAMPLE 4

The nonlinear optical film comprising 2 wt. parts of POE and 1 wt. part of P-NA after voltage application obtained in Example 1 was peeled off from the glass substrate coated with ITO and sandwiched between a pair of glass substrates. The nonlinear optical film in this sandwiched form was irradiated with a 1 mm dia. spot beam of $Nd^{3+}$:YAG laser pulse of 100 mJ, 10 nsec. and wavelength of 1.064 micron for 1 sec at 10 Hz. As a result, the irradiated portion of the nonlinear optical film showed utterly no change, thus showing a good resistance to optical damage.

As described above, according to the present invention, a layer of nonlinear optical material preferably in the form of a film is illuminated imagewise with laser light to provide a display image of scattered higher order harmonic. As a result, it is possible to provide a fine display of a large area by a simple apparatus. The nonlinear optical film can be formed in a large area with a small thickness and is thus suited for inexpensive mass production. The laser illumination means can be simple in organization because laser illumination can be effected without strict alignment with a minute pixel specifically formed on the nonlinear optical material, so that a flat display of a high-degree of fineness and a large area can be realized with a simple structure and in an inexpensive manner. Further, the display medium in the form of a film shows an excellent resistance to optical damage so that a highly luminous and bright display apparatus with good durability can be realized.

What is claimed is:
1. A display method, comprising the steps of:
providing a display medium having a display area capable of converting coherent light into light of a shorter wavelength through a nonlinear optical effect and converting the coherent light into scattered light, and
illuminating imagewise the display area with coherent light to form a display image with scattered light having a wavelength different from that of the coherent light at the illuminated part of the display area.

2. A method according to claim 1, wherein said display medium comprises a display layer providing the display area.

3. A method according to claim 2, wherein said display layer is in the form of a film.

4. A method according to claim 3, wherein said film comprises a low-molecular weight compound and a polymer.

5. A method according to claim 4, wherein said low-molecular weight compound is an inorganic compound in the form of particles dispersed in the film.

6. A method according to claim 4, wherein said low-molecular weight compound is an organic compound in the form of particles dispersed in the film.

7. A method according to claim 4, wherein said film comprises a solid solution of the low-molecular weight compound in the polymer.

8. A method according to claim 4, wherein said low-molecular weight compound is in the form of a crystal.

9. A method according to claim 4, wherein said polymer is polyoxyalkylene.

10. A method according to claim 7, wherein said polymer is polyoxyalkylene.

11. A method according to claim 2, wherein said display layer contains a fluorescent material.

12. A method according to claim 2, wherein said display medium comprises a fluorescent layer in addition to the display layer.

13. A method according to claim 2, wherein said display medium comprises a second display layer showing a nonlinear optical effect in addition to said display layer.

14. A method according to claim 13, wherein said second display layer comprises a film of a solid solution of a low-molecular weight compound in polyoxyalkylene.

15. A method according to claim 2, wherein said display medium further comprises a bandpass filter.

16. A method according to claim 2, wherein said display medium further comprises a reflection layer.

17. A method according to claim 2, wherein said display medium further comprises a dielectric mirror.

18. A method according to claim 1, wherein said coherent light comprises laser beam.

19. A display apparatus, comprising:
a display medium having a display area capable of converting coherent light into light of a shorter wavelength through a nonlinear optical effect and converting the coherent light into scattered light, and
imagewise illumination means for illuminating imagewise the display area with coherent light to form a display image with scattered light having a wavelength different form that of the coherent light at the illuminated part of the display area.

20. An apparatus according to claim 19, wherein said display medium comprises a display layer providing the display area.

21. An apparatus according to claim 20, wherein said display layer is in the form of a film.

22. An apparatus according to claim 19, wherein said imagewise illumination means includes a coherent light source and scanning light deflecting means.

23. An apparatus according to claim 22, wherein said imagewise illumination means includes at least two coherent light sources emitting different wavelengths of coherent light in a longer-wavelength non-visible region.

24. An apparatus according to claim 22, wherein said imagewise illumination means includes three coherent light sources emitting different wavelengths of coherent light in a longer-wavelength non-visible region.

25. An apparatus according to claim 22, wherein said scanning light deflecting means comprises a polygonal mirror, Galvano mirror or rotational mirror.

* * * * *

UNITED STATES PATENT AND TRADEMARK OFFICE
CERTIFICATE OF CORRECTION

PATENT NO. : 4,943,145

DATED : July 24, 1990

INVENTOR(S) : Seizo Miyata

It is certified that error appears in the above-identified patent and that said Letters Patent is hereby corrected as shown below:

On Title Page item

[30] FOREIGN APPLICATION PRIORITY DATA:

Jul. 13, 1987 [JP] Japan.... 175200" should read
--Jul. 13, 1987 [JP] Japan.... 62-175200--.

COLUMN 1:

Line 29, "be" should read --by--.

Line 60, "ad" should read --and--.

COLUMN 2:

Line 49, "ad" should read --and--.

COLUMN 8:

Line 24,

"(68) H          H          CH"

should read

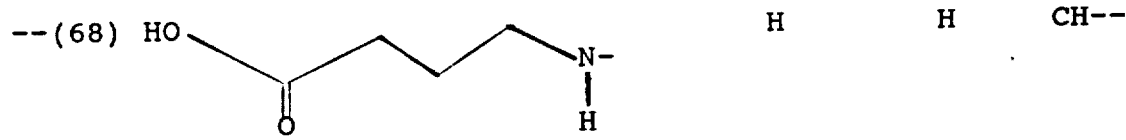

UNITED STATES PATENT AND TRADEMARK OFFICE
CERTIFICATE OF CORRECTION

PATENT NO. : 4,943,145

DATED : July 24, 1990

INVENTOR(S) : Seizo Miyata

It is certified that error appears in the above-identified patent and that said Letters Patent is hereby corrected as shown below:

Lines 26-32,

"(69) 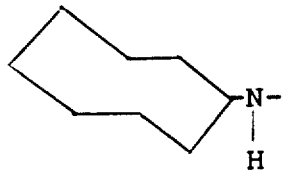    H    CH .
                              H    ..
                                   (69a)
                                   N ...
                                   (69b)"

should read

--(69) 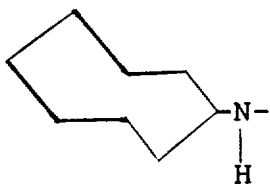   H    H    CH ...
                              H    H
                                   (69a)
                                   N ...
                                   (69b)"

Lines 60-67,

"CH ...          --CH ...
(77a)            (77a)
N ...            N ...
(77b)   should   (77b)
CH ...  read     CH ...
(77c)            (77c)
CH ...           CH ...
(77d)"           (77d)--

UNITED STATES PATENT AND TRADEMARK OFFICE
CERTIFICATE OF CORRECTION

PATENT NO. : 4,943,145

DATED : July 24, 1990

INVENTOR(S) : Seizo Miyata

It is certified that error appears in the above-identified patent and that said Letters Patent is hereby corrected as shown below:

COLUMN 9:

Lines 11-17,

"CH ...
(79a)
CH ...
(79b)          should
CH ...          read
(79c)
N ...
(79d)"

--CH ...
(79a)
CH ...
(79b)
CH ...
(79c)
N ...
(79d)
CH ...--

COLUMN 10:

Line 59, "crylontrile" should read --crylonitrile--.

Line 67, "ad" should read --and--.

COLUMN 13:

Line 39, "optical" should be deleted.

COLUMN 14:

Line 13, "0.05- wt.%," should read --0.05-10 wt.%,--.

UNITED STATES PATENT AND TRADEMARK OFFICE
CERTIFICATE OF CORRECTION

PATENT NO. : 4,943,145

DATED : July 24, 1990

INVENTOR(S) : Seizo Miyata

Page 4 of 4

It is certified that error appears in the above-identified patent and that said Letters Patent is hereby corrected as shown below:

COLUMN 16:

Line 62, "form" should read --from--.

COLUMN 17:

Line 3, "and" should read --and a--.

Signed and Sealed this

Ninth Day of March, 1993

Attest:

STEPHEN G. KUNIN

*Attesting Officer*  *Acting Commissioner of Patents and Trademarks*